(12) United States Patent
Gustafsson et al.

(10) Patent No.: US 6,310,931 B1
(45) Date of Patent: Oct. 30, 2001

(54) DEVICE AND METHOD FOR LOCKING RODS IN A BOTTOM TIE PLATE OF A FUEL ASSEMBLY

(75) Inventors: Tommy Gustafsson, Köping; Anders Wallander, Västerås, both of (SE)

(73) Assignee: ABB Atom AB, Vasteras (SE)

( * ) Notice: Subject to any disclaimer, the term of this patent is extended or adjusted under 35 U.S.C. 154(b) by 0 days.

(21) Appl. No.: 09/367,827

(22) PCT Filed: Mar. 4, 1998

(86) PCT No.: PCT/SE98/00383

§ 371 Date: Sep. 27, 1999

§ 102(e) Date: Sep. 27, 1999

(87) PCT Pub. No.: WO98/40894

PCT Pub. Date: Sep. 17, 1998

(30) Foreign Application Priority Data

Mar. 11, 1997 (SE) .................................................. 9700855

(51) Int. Cl.⁷ .................................................. G21C 3/326
(52) U.S. Cl. .......................... 376/440; 376/364; 376/446; 376/437; 376/441; 376/451; 376/261
(58) Field of Search ...................................... 376/261, 440, 376/438, 437, 434, 441, 353, 446, 449, 451, 442, 454, 364

(56) References Cited

U.S. PATENT DOCUMENTS

| 3,769,158 | * | 10/1973 | Winders ................................. 176/78 |
|---|---|---|---|
| 3,996,101 | * | 12/1976 | Marmonier et al. .................... 176/78 |
| 4,344,915 | * | 8/1982 | Christiansen ........................... 376/437 |
| 4,492,668 | | 1/1985 | Pilgrim, Jr. et al. .................. 376/440 |
| 4,818,473 | | 4/1989 | Lui ....................................... 376/261 |
| 4,919,883 | * | 4/1990 | Bryan .................................... 376/352 |
| 5,230,861 | * | 7/1993 | Nylund .................................. 376/439 |
| 5,309,491 | * | 5/1994 | Lippert et al. ........................ 376/364 |
| 5,481,579 | * | 1/1996 | Johansson et al. ................... 376/446 |
| 5,553,108 | | 9/1996 | Johansson ............................. 376/444 |
| 5,748,695 | * | 5/1998 | Dunlap et al. ........................ 376/446 |

* cited by examiner

Primary Examiner—Michael J. Carone
Assistant Examiner—J A. Richardson
(74) Attorney, Agent, or Firm—Connolly Bove Lodge & Hutz

(57) ABSTRACT

The present invention relates to a fuel assembly (1) and a method therefor. The fuel assembly is intended for a light-water cooled nuclear reactor and comprises a first and a second locking member (9a, 9b, 10), a plurality of elongated elements (3, 3a) wherein each of the lower ends of the elongated elements is provided with an end plug (3b). The end plug (3b) is arranged guided or locked in an end plate (6) which comprises at least two adjacently disposed plug holes (6b) for receiving one end plug (3b) each. The first locking member (9a, 9b) is made in an end plug (3b) and has a concave shape and the second locking member (10) is arranged slidable in a locking hole (6c) which is adapted to extend between the two adjacently disposed plug holes (6b) and opening out into these. The second locking member (10) is made with a length exceeding the length of the locking hole (6c) and has end surfaces with shapes intended for cooperation with the concave surface of the first locking member (9a, 9b).

9 Claims, 4 Drawing Sheets

B - B

A - A

C - C

DEVICE AND METHOD FOR LOCKING RODS IN A BOTTOM TIE PLATE OF A FUEL ASSEMBLY

TECHNICAL FIELD

The present invention relates to a fuel assembly for a light-water nuclear reactor and a method therefor. The fuel assembly is of the type which has a structure comprising end parts and elongated elements extending therebetween which are positioned in relation to each other with the aid of spacers. At least one of the elongated elements is connected to one of, or both of, the end parts. Fuel assemblies of this type are normally cooled and moderated by light water. Examples of light-water cooled reactors are boiling water reactors and pressurized-water reactors.

BACKGROUND ART

A fuel assembly normally comprises a plurality of vertical fuel rods, which, in spaced relationship, are arranged between a pair of end parts referred to as a bottom tie plate and a top tie plate. The bottom tie plate is provided with continuous, vertical channels for conducting coolant through the bottom tie plate and into the spaces between the elongated elements in order to cool the elongated elements during a nuclear reaction.

For a correct mutual positioning of the elongated elements, spacers are arranged at several levels along the fuel assembly.

The lower ends of the elongated elements, which ends are arranged in the assembly, are normally provided with plugs which are arranged resting on and guided in openings, so-called plug holes, in the bottom tie plate. The upper ends of the elongated elements, which ends are arranged in the assembly, are arranged free or guided in the top tie plate.

To be able to handle a bundle of elongated elements as one unit, one or more elongated elements are arranged to keep the bundle together. These elongated supporting elements may, for example, consist of ordinary fuel rods in a boiling reactor and are then referred to as supporting fuel rods, or of control rod guide tubes in a pressurized-water reactor. These supporting elements are normally locked in the bottom tie plate. Non-supporting elongated elements are prevented from lifting from the bottom tie plate, due to lifting forces caused by the flow of the coolant, partly by their own weight, partly by friction in the spacers and, in addition, by a mechanical stop means consisting of the top tie plate.

Other elongated elements, which may be locked in the bottom tie plate, are so-called part-length rods and spacer holder rods. The task of a spacer holder rod is to limit the movement of the spacers in the axial direction because of the coolant flowing upwards through the fuel assembly. In a fuel assembly for a boiling water reactor, the spacer holder rods may consist of one or more ordinary fuel rods or of water-conducting rods. In a fuel assembly for a pressurized-water reactor, it is normally the control rod guide tubes which have the function of holding the spacers.

Usually, the bottom tie plate is made of stainless steel to have good mechanical properties. The top tie plate may be constructed in a plurality of different ways depending on the function it has in the relevant fuel assembly. At least some of the elongated elements is usually provided with an end plug which is inserted into or through the bottom tie plate for locking the elongated element to the bottom tie plate. The end plugs are normally made of a zirconium-base alloy. It is desirable for the end plugs to be detachably arranged in relation to the bottom tie plate so that they can be mounted and dismantled, respectively, for replacing failing parts.

Especially in fuel assemblies comprising part-length fuel rods, which do not reach from the bottom tie plate and up to the top tie plate, it is important to ensure that the part-length fuel rods are not lifted out and lose their guidance in the bottom tie plate because of the friction from the coolant flowing upwards through the bottom tie plate. Part-length rods, which extend from the bottom tie plate up towards the top tie plate without reaching it, are guided above the bottom tie plate, by the mentioned spacers, at different levels along the bundle. In the event that the guiding in the bottom tie plate is lost by a fuel rod being displaced upwards in the fuel assembly, long free ends may be put into vibration and cause abrasion on adjacently located fuel rods and, in the worst case, cause penetration of one or more fuel rods such that fissionable material may enter into the coolant.

Supporting rods are usually locked to the bottom tie plate by a threaded joint. It is, for example, common for the supporting rod to be provided with a threaded end plug which is passed through a continuous plug hole arranged in the bottom tie plate and is fixed to the bottom tie plate by arranging a nut on the lower side of the bottom tie plate, when arranged in the reactor. Another common method is to provide the plug hole in the bottom tie plate with a thread for cooperation with the threaded end plug. A difficulty in connection with threaded joints is that the threaded joint, because of corrosion, may seize after operation of the reactor. Also particles which are scaled and brought with the coolant may become deposited on the threaded surfaces and give rise to seizing. Corrosion is particularly difficult when the threaded plug consists of a zirconium alloy and the thread in its fixing element, for example the bottom tie plate or a nut, is made of stainless steel.

When designing a fuel assembly of the above-mentioned type, it is desirable to be able to handle, as far as possible, the parts included in the fuel assembly from the upper end of the fuel assembly. It is not possible to handle the parts included from above when using a threaded joint where the rod is to be fixed with a nut to the underside of the bottom tie plate. Another difficulty with this type of threaded joint is that the nut and the plug project from under the bottom tie plate in an area where the coolant flow is very turbulent. The turbulent flowing coolant may give rise to vibrations and hence abrasion of the end plug. This implies that, when designing the fuel assembly, it is also desirable to avoid parts which project from under the bottom tie plate.

It is possible to handle the parts included from above when using a threaded joint of the type where the bottom tie plate comprises threaded holes into which the threaded end plugs of the rods are screwed. One difficulty is during dismantling when the rod is turned in the opposite direction. On the one hand, it is awkward to rotate a rod which has a length of four metres and, on the other hand, the threaded joint may seize. In the event that the thread seizes when dismantling it, there is a risk that the rod is subjected to turning forces and, in the worst case, that it is twisted off. In addition, it involves considerable handling problems since it is difficult to reach and mount and dismantle rods with a shorter length than adjacently located rods, and especially if the thread seizes.

Locking normal, that is, non-supporting, fuel rods to the bottom tie plate in a corresponding way is unnecessary and disadvantageous. There is no need of attaching normal fuel rods in this way since the forces from the upwardly flowing flow are much lower than the forces acting on the bundle when handling, such as lifting, the entire bundle.

The object of the invention is to achieve a fuel assembly with a bottom tie plate which permits a detachable locking of the end plugs of elongated elements, both supporting and non-supporting and full-length and part-length elements, to the bottom tie plate.

SUMMARY OF THE INVENTION, ADVANTAGES

The present invention relates to a fuel assembly comprising a bottom tie plate and at least one elongated element which is detachably locked to the bottom tie plate with the aid of a locking member.

More precisely, the present invention relates to a fuel assembly comprising a plurality of elongated elements which, when arranged in the assembly, comprise lower ends which are provided with end plugs. The bottom tie plate is constructed with at least two adjacently located plug holes for receiving one end plug each. In a pressurized-water nuclear reactor, a rod arranged close to the locking hole is designed so as to extend down into the bottom tie plate for locking the locking plug to an end plug of a control rod guide tube. Further, the bottom tie plate is provided with a locking hole arranged to extend between two adjacently located plug holes. A first locking member in the form of a recess with a concave shape is arranged in the end plug. When the end plug is inserted into the plug hole, the first locking member is arranged at the same level as the orifice of the locking hole into the plug hole. The first locking member is adapted to cooperate with a second locking member in the form of a locking plug with a convex or plane shape. The locking plug is arranged in the locking hole in which it is slidable in a direction which is preferably perpendicular to the longitudinal axis of the end plug. The locking plug has an axial length which is larger than the axial length of the locking hole.

Locking of an end plug to the bottom tie plate is achieved by insertion of an end plug which is to be locked to the bottom tie plate comprising a first locking member. In those cases where it is necessary, when being inserted into the plug hole, the end plug displaces the locking plug in the locking hole so as to permit insertion of the end plug. More precisely, the locking plug is displaced partly through the orifice of the locking hole and out into the plug hole arranged adjacent thereto. After this, an end plug, which is not to be locked to the bottom tie plate, is inserted into the plug hole arranged adjacent thereto. The end plug now inserted displaces the locking plug in the opposite direction, that is, against the end plug which was first inserted, whereby it is brought to cooperate with the first locking member, the recess, therein and hence to lock the end plug to the bottom tie plate. When dismantling the end plugs, these plugs are pulled out in reverse order, that is, first the non-locked rod with the associated end plug is pulled out, and then the locked one.

The advantage of the invention is that a detachable locking of the rods to the bottom tie plate is achieved in a simple way. It is also an advantage that mounting and dismantling of the rods from the bottom tie plate may take place from above. Another advantage is that no rotation of the elongated elements is required for dismantling from the bottom tie plate but only a limited force in the axial direction of the elongated element. Further, it is an advantage that locking takes place inside the bottom tie plate, whereby parts projecting from under the bottom tie plates are avoided.

Still another advantage is provided in that the locking plug and the bottom tie plate may be manufactured of the same or similar material, the risk of seizing due to corrosion thus being reduced.

BRIEF DESCRIPTION OF THE DRAWINGS

The invention will be most readily understood with reference to the accompanying drawings.

DESCRIPTION OF THE PREFERRED EMBODIMENTS

Figure 1A:
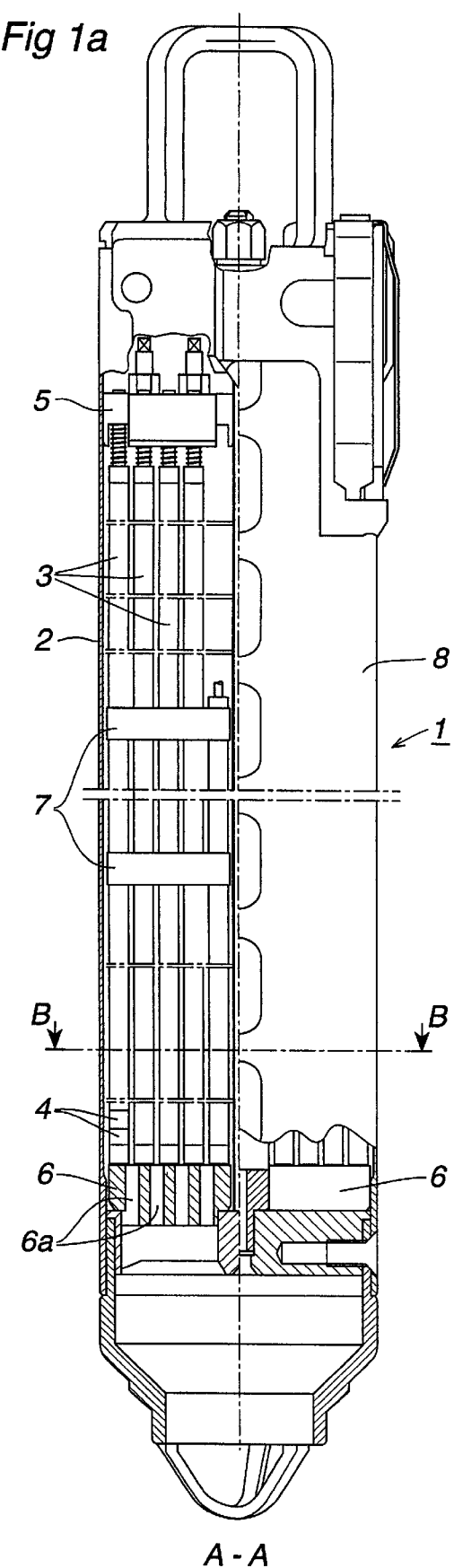
FIG. 1a shows in a section A—A in FIG. 1b a boiling water fuel assembly.
Figure 1B:
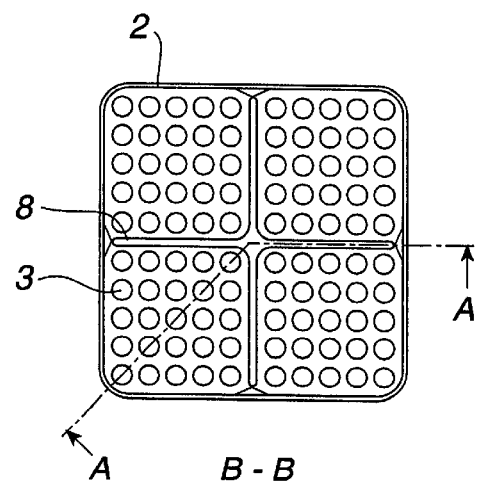
FIG. 1b shows in a section B—B in FIG. 1a the same fuel assembly.

FIG. 1a shows a boiling water fuel assembly 1 which comprises a long tubular container, of substantially rectangular cross section, referred to as fuel channel 2. The fuel channel 2 is open at both ends so as to form a continuous flow passage through which the coolant of the reactor flows. The fuel assembly 1 comprises a large number of equally long tubular fuel rods 3, arranged in parallel in a bundle, in which pellets 4 of a nuclear fuel are arranged. The fuel rods 3, are arranged spaced from each other in four orthogonal sub-bundles by means of a cruciform support means 8 (see also FIG. 1b). The respective sub-bundle of fuel rods 3 is retained at the top by a top tie plate 5 and at the bottom by a bottom tie plate 6. The fuel rods 3 in the respective sub-bundle are kept spaced apart from each other by means of spacers 7 and are prevented from bending or vibrating when the reactor is in operation. The bottom tie plate 6 comprises a plurality of through-holes 6a for passage of coolant. Further, the bottom tie plate 6 comprises a plurality of plug holes 6b for guiding the elongated elements 3, 3a with associated end plugs 3b (see FIG. 4). In FIG. 1a, the rod which is arranged nearest the centre line is made as a part-length rod. The part-length rod extends from the bottom tie plate 6 and upwards through the fuel assembly 1 without reaching the top tie plate 5.

Figure 2A:
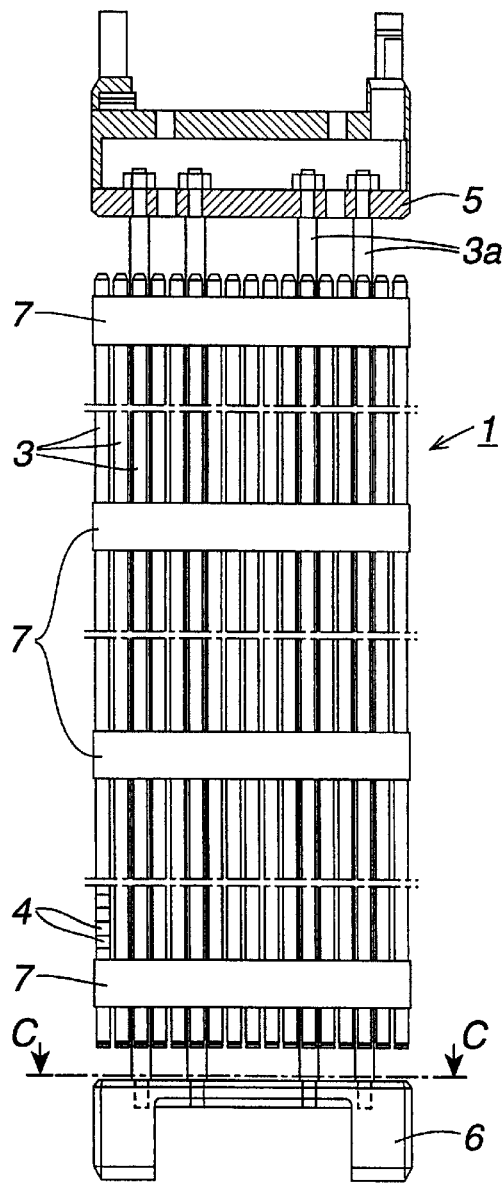
FIG. 2a shows, in a view from the side, a pressurized-water fuel assembly.
Figure 2B:
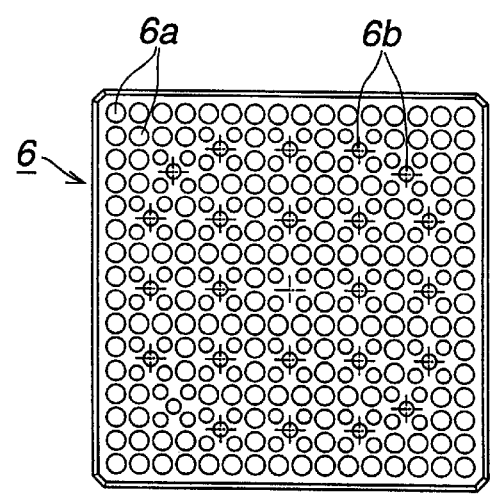
FIG. 2b shows, in a section C—C in FIG. 2a, a bottom tie

FIGS. 2a, 2b show a fuel assembly 1 of pressurized-water type which comprises a number of elongated tubular fuel rods 3 and control rod guide tubes 3a, arranged in parallel. The fuel rods 3 accommodate pellets 4 of a nuclear fuel. The control rod guide tubes 3a are retained at the top by a top nozzle 5 and at the bottom by a bottom nozzle 6. The fuel rods 3 are kept spaced apart from each other by means of spacers 7. The holes in FIG. 2b provided with centre lines are plug holes 6b for receiving elongated elements. The other holes 6a are intended for passage of coolant flow.

Figure 3A:
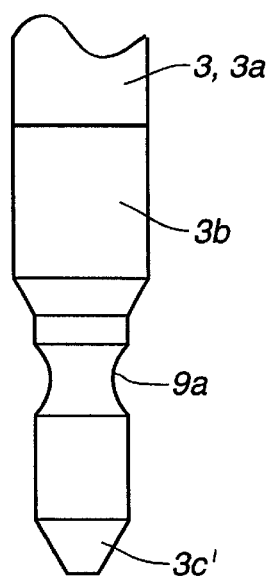
FIG. 3a shows, in a view from the side, an end plug with a first locking member.

FIG. 3a shows in a view from the side an end plug 3b connected to an elongated element 3, 3a. The end plug 3b is provided with a first locking member in the form of a recess 9a in the form of a slot with a substantially spherical shape which extends around the periphery of the end plug. The lower part of the end plug 3b, designated 3c', may be provided with a bevelled edge to facilitate guiding of the end plug into the plug 6b in the bottom tie plate 6.

Figure 3B:
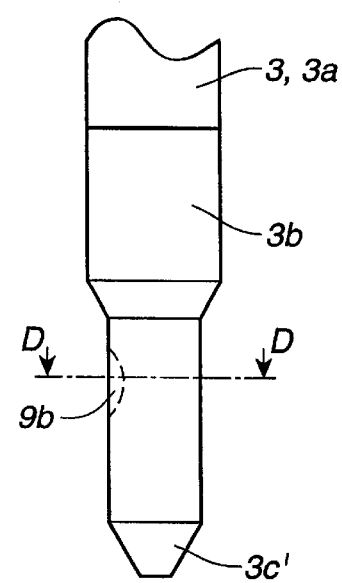
FIG. 3b shows, in a view from the side, a bottom plug with an alternative embodiment of a first locking member.
Figure 3C:
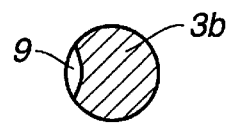
FIG. 3c shows the first locking member in FIG. 3b in a section D—D.

FIG. 3b shows an alternative embodiment of a first locking member 9b arranged in the end plug 3b. Here, the first locking member is made as a recess in the form of a cavity with a substantially spherical shape.

Figure 4:
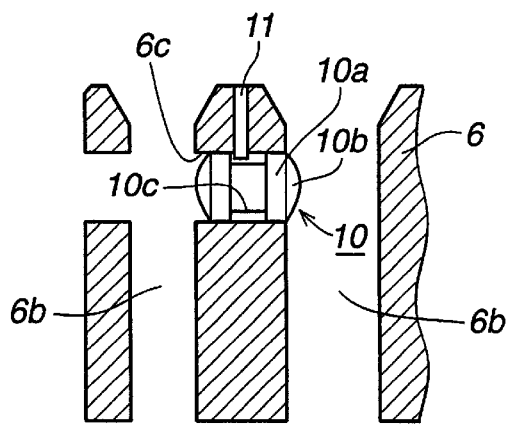
FIG. 4 shows, in a section from the side, two adjacently located plug holes in a bottom tie plate and a second locking member arranged in a locking hole arranged between the adjacently located plug holes in the bottom tie plate.

FIG. 4 shows part of a bottom tie plate 6 which comprises two adjacently located plug holes 6b and a locking hole 6c extending between these plug holes 6b and opening out thereinto. Further, a second locking member 10 arranged in the locking hole 6c is shown. In the embodiment chosen, the second locking member 10 made as a substantially circular-cylindrical body 10a which is slidable in the axial direction of the locking hole 6c. Each end of the substantially circular-cylindrical body 10a is made with a radius and has a spherical shape 10b.

Figure 5:
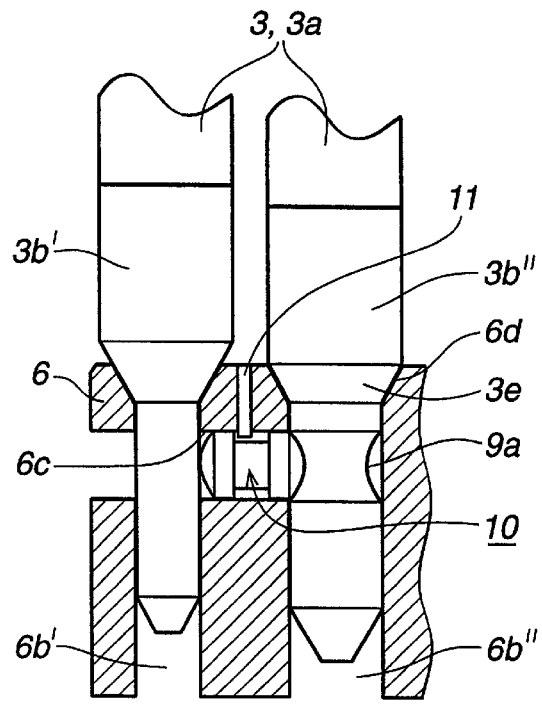
FIG. 5 shows an elongated element with an end plug which, with a second locking member arranged inserted into a first locking member, is locked to a bottom tie plate.

FIG. 5 shows how the locking plug 10 with its spherical end 10b cooperates with the recess 9a of an end plug 3b according to FIG. 3a. During mounting, the end plug 3b" which is to be locked in the plug hole 6b", that is in the plug hole 6b' shown on the righthand side in FIG. 5, is first inserted, whereby the locking plug 10 is moved laterally thorough the locking hole 6c and partly into the plug hole 6b' which is shown on the lefthand side in FIG. 5. Then, an adjacently located end plug 3b' is inserted into the plug hole 6b'. The end plug 3b' pushes the locking plug 10 in the opposite direction through the locking hole 6c such that it is arranged, with its spherical end 10b, in the spherical recess 9a in the end plug 3b". Thus, one of the end plug 3b" is locked to the bottom tie plate 6 whereas the other end plug 3b' is arranged guided in the bottom tie plate 6.

When dismantling elongated elements 3, 3a which are arranged guided with their respective end plugs 3b' in the bottom tie plate, these end plugs are lifted from the plug holes 6b'. To dismantle elongated elements which are arranged with their respective end plugs 3b" locked to the bottom tie plate 6, a certain lifting force in the axial direction is required to achieve a displacement of the locking plug 10 in the lateral direction in the locking hole 6c such that the end plug 3b" with the first locking member 9a is separated from the locking plug 10.

By arranging the first locking member as an opening 9b in the end plug 3b, the end plug 3b may be locked so as to prevent rotation in the bottom tie plate 6. Prevention of rotation in the bottom tie plate 6 is desirable, especially when it is a question of locking of spacer holder rods.

To prevent the locking plug 10 from leaving the locking hole 6c, when the elongated elements 3, 3a are not mounted in the bottom tie plate 6, a locking pin 11 may be arranged from one of the flat surfaces of the bottom tie plate, in FIGS. 4 and 5 shown from the upper flat surface and at an angle to the locking plug 10. The locking pin 11 may be fixed to the bottom tie plate 6, for example by welding, and is arranged to extend into the locking hole 6c such that the possible displacement of the locking plug 10 between two adjacently located plug holes 6b is limited to a distance which may correspond to the length of a part 10c of the circular-cylindrical body 10a of the locking plug which is provided with a smaller diameter than the rest of the body 10a.

The locking plug 10 is suitably placed protected inside the bottom tie plate and is advantageously made of stainless steel, which is good from the point of view of corrosion. Alternatively, the locking plug 10 is made of a nickel-base alloy, for example Inconel. By placing the locking plug 10 inside the bottom tie plate 6, the entire arrangement is protected against the coolant flowing through the fuel assembly 1, thus preventing vibration and abrasion associated therewith.

The first and second locking members 9a, 9b, 10 need not, of course, be made with spherical surfaces. The surface may have an arbitrary double-curved shape, a plane shape, or a bevelled shape. The essential point is that the concave shape of the first locking member 9a, 9b may cooperate with the shape of the second locking member 10 for locking the end plug 3b" to the bottom tie plate 6. The locking plug 10 is thus provided at each end with surfaces which are suitable for cooperation with the first locking member 9a, 9b in that end plug 3b which it is to lock and to facilitate dismantling thereof from the bottom tie plate 6.

Figure 6:
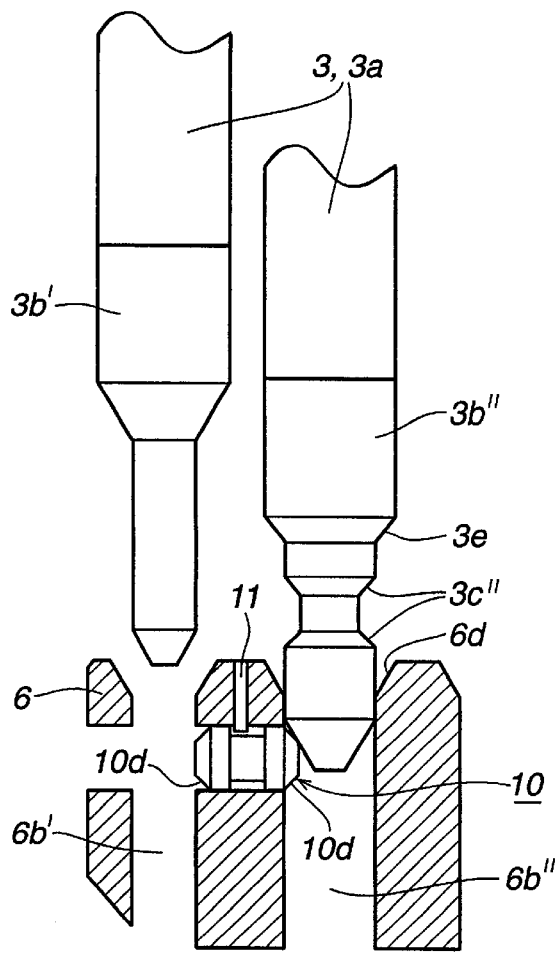
FIG. 6 shows an elongated element which, with an alternative embodiment of a second locking member arranged inserted into a first locking member, is locked to a bottom tie plate.

FIG. 6 shows a locking plug 10 which at each end is provided with bevelled edges designated 10d. The end plug 3b" which is to be locked is provided with a waist with corresponding bevelled edges designated 3c" to cooperate with the locking plug 10.

Figure 7:
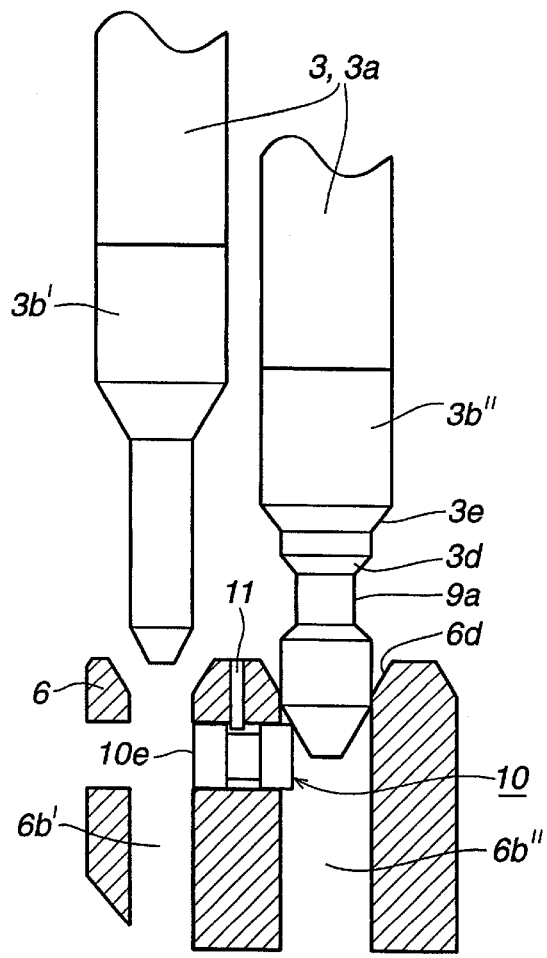
FIG. 7 shows an elongated element which, with an additional alternative embodiment of a second locking member arranged inserted into a first locking member, is locked to a bottom tie plate.

FIG. 7 shows a locking plug 10 which at each end is provided with plane end surfaces designated 10e. The end plug 3b" which is to be locked is provided with a waist with corresponding plane surfaces to cooperate with the locking plug 10. To facilitate mounting and dismantling of the elongated elements 3, 3a, the end plug 3b" is further provided with a bevelled edge 3d.

FIGS. 5, 6 and 7 show the end plug 3b" with a bevelled edge designated 3e for cooperation with a bevelled edge 6d formed in the bottom tie plate in connection with the mounting of the elongated elements 3, 3a in the bottom tie plate 6.

Figure 8:
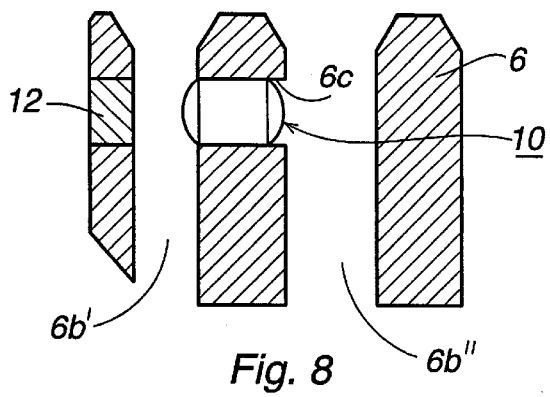
FIG. 8 shows, in a section from the side, two adjacently located plug holes in a bottom tie plate and an alternative embodiment of a second locking member arranged in a locking hole arranged between the adjacently located plug holes in the bottom tie plate.

FIG. 8 shows a locking plug 10, the diameter of which substantially corresponds to the diameter of the locking hole 6c. Further, it is shown that a hole for insertion of the locking plug 10 into the bottom tie plate is plugged up (see reference numeral 12). The hole may, for example, be welded up after the locking plug 10 has been inserted into the locking hole 6c. In this way, particles in the coolant are prevented from entering the locking hole 6c, thus causing possible seizing between the locking plug 10 and the locking hole 6c. Plugging of the hole also ensures that the locking plug 10 does not leave the bottom tie plate 6.

What is claimed is:

1. A fuel assembly for a light-water cooled nuclear reactor, comprising:
   a first and a second locking member;
   a plurality of elongated elements wherein each of lower ends of the elongated elements is provided with an end plug, where the end plug is arranged guided or locked in an end plate which comprises at least two adjacently located plug holes for receiving an end plug each;

wherein:

the first locking member is made as a recess in an end plug; and the second locking member is arranged displaceable in a locking hole arranged extending between two adjacently arranged plug holes and opening out thereinto, the second locking member being made with a length which exceeds the length of the locking hole and having end surfaces with a shape intended for cooperation with the first locking member in a plug hole and an end plug in the adjacently located plug hole.

2. A fuel assembly (1) according to claim 1, characterized in that the first locking member (9a, 9b) is designed so as to extend around the periphery of the end plug (3b).

3. A fuel assembly (1) according to claim 1, characterized in that the first locking member (9a, 9b) has a substantially concave shape.

4. A fuel assembly (1) according to claim 1, characterized in that the first locking member (9a, 9b) has a substantially spherical shape.

5. A fuel assembly (1) according to claim 3, characterized in that the second locking member (10) is designed as a substantially cylindrical body (10a) with two ends where each end has a convex (10b) shape.

6. A fuel assembly (1) according to claim 5, characterized in that at least one end of the second locking member (10) is designed with a substantially spherical shape (10b).

7. A fuel assembly (1) according to claim 1, characterized in that the second locking member (10) is designed as a substantially cylindrical body (10a) with two ends where at least one end has a plane shape (10e).

8. A fuel assembly (1) according to claim 1, characterized in that the second locking member (10) is designed as a substantially cylindrical body (10a) with two ends where at least one end has a bevelled shape (10d).

9. A fuel assembly (1) according to claim 1, characterized in that the second locking member (10) is designed with a smaller diameter of a part (10c) of the cylindrical body (10a) for cooperation with a locking pin (11) for limiting the movement of the second locking member (10) in the locking hole (6c).

* * * * *